United States Patent
Ehrhart et al.

(10) Patent No.: US 8,560,094 B2
(45) Date of Patent: Oct. 15, 2013

(54) SAFETY CONTROLLER AND METHOD FOR CONTROLLING AN AUTOMATED INSTALLATION

(75) Inventors: Helmut Ehrhart, Stuttgart (DE); Matthias Reusch, Hohenstein (DE)

(73) Assignee: Pilz GmbH & Co. KG, Ostfildern (DE)

( * ) Notice: Subject to any disclaimer, the term of this patent is extended or adjusted under 35 U.S.C. 154(b) by 29 days.

(21) Appl. No.: 13/114,332

(22) Filed: May 24, 2011

(65) Prior Publication Data
US 2011/0301720 A1    Dec. 8, 2011

Related U.S. Application Data

(63) Continuation of application No. PCT/EP2009/008262, filed on Nov. 20, 2009.

(30) Foreign Application Priority Data

Nov. 25, 2008 (DE) .................. 10 2008 060 011

(51) Int. Cl.
*G05B 9/02* (2006.01)
*G05B 11/01* (2006.01)

(52) U.S. Cl.
USPC .................. 700/79; 700/12; 700/21

(58) Field of Classification Search
USPC ............. 700/12–14, 17–18, 21, 79, 86–87
See application file for complete search history.

(56) References Cited

U.S. PATENT DOCUMENTS

| | | | |
|---|---|---|---|
| 5,689,415 A * | 11/1997 | Calotychos et al. | 700/67 |
| 5,777,896 A | 7/1998 | Arita et al. | |
| 5,950,150 A * | 9/1999 | Lloyd et al. | 702/183 |
| 7,143,011 B2 | 11/2006 | Yoshie et al. | |
| 7,277,822 B2 * | 10/2007 | Blemel | 702/183 |
| 7,328,369 B2 * | 2/2008 | Manoni | 714/11 |

(Continued)

FOREIGN PATENT DOCUMENTS

| | | |
|---|---|---|
| CN | 1440523 A | 9/2003 |
| DE | 10 2004 003 569 A1 | 12/2004 |

(Continued)

OTHER PUBLICATIONS

DIN EN 954-1, Safety-related parts of control systems Part 1: General principles for design, Mar. 1997, 34 pages.

(Continued)

*Primary Examiner* — Ramesh Patel
(74) *Attorney, Agent, or Firm* — Harness, Dickey & Pierce, P.L.C.

(57) ABSTRACT

A safety controller for controlling an automated installation which has a plurality of sensors and a plurality of actuators, comprises a control unit to which a plurality of control input signals are supplied by the sensors. The control unit produces a plurality of control output signals in an automatic mode on the basis of the control input signals in accordance with a user program running in said control unit. The plurality of control output signals is used to actuate the plurality of actuators. The safety controller also has a diagnosis evaluation unit to which a number of diagnoses input signals are supplied. The diagnosis evaluation unit takes the diagnosis input signals as a basis for ascertaining which of a plurality of operating states is present at a defined instant of time. The diagnosis evaluation unit produces an operating state data record which represents an ascertained operating state. The safety controller also has an interface for a display unit in order to display diagnosis reports. The operating state data record includes a plurality of diagnosis data and a Boolean status indicator. The control unit actuates at least one actuator on the basis of the Boolean status indicator contained in the operating state data record.

8 Claims, 2 Drawing Sheets

(56) References Cited

U.S. PATENT DOCUMENTS

| | | |
|---|---|---|
| 2004/0030429 A1 | 2/2004 | Baba et al. |
| 2004/0230323 A1* | 11/2004 | Glanzer et al. .................. 700/18 |
| 2006/0129358 A1 | 6/2006 | Yoshie et al. |
| 2008/0004723 A1* | 1/2008 | Fax et al. ........................ 700/51 |
| 2009/0105849 A1* | 4/2009 | Glanzer et al. .................. 700/21 |
| 2009/0112336 A1* | 4/2009 | Duffy et al. ..................... 700/79 |
| 2010/0268358 A1* | 10/2010 | Cantarelli et al. ............... 700/86 |

FOREIGN PATENT DOCUMENTS

| | | |
|---|---|---|
| EP | 1 331 536 A1 | 7/2003 |
| EP | 1 357 373 A2 | 10/2003 |
| EP | 1 855 172 A1 | 11/2007 |
| GB | 2 399 192 A | 9/2004 |

OTHER PUBLICATIONS

EN ISO 13849-1, Safety of machinery—Safety-related parts of control systems—Part 1: General principles for design, Nov. 2006, 97 pages.

CEI IEC 61508-2, Functional safety of electrical/electronic/programmable electronic safety-related systems—Part 2: Requirements for electrical/electronic/programmable electronic safety-related systems, May 2000, 152 pages.

\* cited by examiner

SAFETY CONTROLLER AND METHOD FOR CONTROLLING AN AUTOMATED INSTALLATION

CROSS REFERENCES TO RELATED APPLICATIONS

This application is a continuation of international patent application PCT/EP2009/08262 filed on Nov. 20, 2009 designating the U.S., which international patent application has been published in German language and claims priority from German patent application DE 10 2008 060 011.3 filed on Nov. 25, 2008. The entire contents of these priority applications are incorporated herein by reference.

BACKGROUND OF THE INVENTION

The present invention relates to a safety controller and a method for controlling an automated installation which comprises a plurality of sensors and a plurality of actuators.

A safety controller in terms of the present invention is an apparatus or an arrangement, which receives input signals provided by sensors and produces output signals therefrom by means of logic combinations and sometimes further signal or data processing steps. The output signals can be supplied to actuators, which then effect specific actions or reactions in the environment on the basis of the input signals.

A preferred area of application for safety controllers of this kind is the monitoring of emergency-off pushbuttons, two-hand controllers, guard doors or light grids in the field of machine safety. Such sensors are used for safeguarding a machine, for example, which presents a hazard to humans or material goods during operation. When the guard door is opened or when the emergency off pushbutton is operated, a respective signal is produced which is supplied to the safety controller as an input signal. In response thereto, the safety controller then uses an actuator, for example, to shut down that part of the machine which is presenting the hazard.

In contrast to a "normal" controller, a characteristic of a safety controller is that the safety controller always ensures a safe state of the installation or machine presenting the hazard even if a malfunction occurs in it or in a device connected to it. Extremely high demands are therefore made of safety controllers in terms of their own fail safety, which results in considerable complexity for development and manufacture.

Usually, safety controllers require particular approval by competent supervisory authorities, such as by the professional associations or the TÜV in Germany, before they are used. In this case, the safety controller must observe prescribed safety standards as set down, by way of example, in the European Standard EN 954-1 or in comparable standards, such as Standard IEC 6158 or Standard EN ISO 13849-1. Subsequently, a safety controller is therefore understood to mean a device or an arrangement which at least complies with safety category 3 of the cited European Standard EN 954-1.

A programmable safety controller allows a user to individually define the logic combinations and any further signal or data processing steps according to his needs using a piece of software that is typically called the user program. This results in a great deal of flexibility in comparison with earlier solutions, in which the logic combinations were defined by selected hard-wiring of various safety devices. By way of example, a user program can be written using a commercially available personal computer (PC) and using appropriate set-up software programs.

Besides actual detection of a malfunction and triggering appropriate countermeasures used to transfer the controlled machine or installation to a safe state, it is also important to provide the user of the controlled machine or installation or another person with information about a malfunction that has occurred. Therefore, it is desirable to display a diagnosis report which represents the malfunction on a display unit. Heretofore, a displayed diagnosis report is dependent only on the malfunction that has been ascertained by an appropriate diagnosis unit. Detection of a malfunction corresponds to the ascertainment of which of a plurality of system states for a safety controller is present at a defined instant of time.

SUMMARY OF THE INVENTION

It is therefore an object of the present invention to provide a safety controller and a method for controlling an automated installation with an improved capability of dealing with undesired situations, such as malfunctions, errors or faulty components.

It is another object to provide a safety controller and a method which allow convenient and flexible fault analysis on the basis of diagnosis information.

It is yet another object to provide a safety controller and a method which allow to react to operational process and systems states in a fast and flexible manner.

It is yet another object to provide a safety controller and a method which allow to adjust the diagnosis information to be displayed to a person in accordance with external circumstances.

According to an aspect of the present invention, there is provided a safety controller for controlling an automated installation which has a plurality of sensors and a plurality of actuators, said safety controller comprising a control unit to which a plurality of control input signals from the sensors are supplied, said control unit being designed to produce a plurality of control output signals on the basis of the control input signals and in accordance with a user program running in an automatic mode in said control unit, wherein the plurality of control output signals are configured to actuate the plurality of actuators, comprising a diagnosis evaluation unit to which a number of diagnosis input signals are supplied, wherein the diagnosis evaluation unit is designed to take the diagnosis input signals as a basis for ascertaining which one of a plurality of operating states is present at a defined instant of time, and comprising an interface for a display unit designed to display diagnosis reports from the diagnosis evaluation unit, wherein the diagnosis evaluation unit produces an operating state data record representing an ascertained operating state of a plurality of operating states, wherein the operating state data record has a plurality of diagnosis data and a Boolean status indicator, and wherein the control unit is designed to actuate at least one of the plurality of actuators as a function of said Boolean status indicator.

According to another aspect of the invention, there is provided a method for controlling an automated installation which comprises a plurality of sensors and a plurality of actuators, the method comprising the steps of supplying a plurality of control input signals from the sensors to a control unit, wherein the control unit produces a plurality of control output signals on the basis of the control input signals and in accordance with a user program running in an automatic mode in said control unit; actuating the plurality of actuators using the plurality of control output signals; ascertaining which one of a plurality of operating states is present at a defined instant of time and producing an operating state data record which represents an ascertained operating state, said operating state data record comprising a plurality of diagnosis data representing the ascertained operating state and a Boolean status indicator; displaying the diagnosis data on a display unit in response to said operating state data record; and actuating at least one of the actuators as a function of the Boolean status indicator.

There is also provided a computer program product comprising a data storage medium having program code stored which is designed to be loaded into the memory of a safety controller for controlling an automated installation having a plurality of sensors and a plurality of actuators, with said program code being designed to carry out a method comprising the following steps when executed on the safety controller: receiving a plurality of control input signals from the sensors and producing a plurality of control output signals on the basis of the control input signals; providing the plurality of control output signals for actuating the plurality of actuators; ascertaining which one of a plurality of operating states is present at a defined instant of time and producing an operating state data record which represents an ascertained operating state, said operating state data record comprising a plurality of diagnosis data representing the ascertained operating state and a Boolean status indicator; displaying the diagnosis data on a display unit in response to said operating state data record; and actuating at least one of the actuators as a function of the Boolean status indicator.

The above safety controller and method are based on the concept of providing an operating state data record, which preferably comprises all diagnosis-related data, for the purpose of displaying diagnosis information. In addition, however, the operating state data record has a Boolean status indicator which can be retrieved and read as a Boolean variable in the user program. It is therefore possible to operate actuators, such as a warning lamp or a buzzer, on the basis of the operating state data record (and therefore only indirectly, at best, on the basis of "genuine" sensor signals). The control unit is therefore provided with a further piece of input information which specifically accumulates all the information required for the system or process diagnosis. The novel operating state data record provides a consistent piece of diagnosis information which is uniform throughout the system and which allows very flexible display and selection of diagnosis information and also a specific reaction to operating states.

In a preferred refinement, the plurality of operating states comprise at least one process state for the installation to be controlled and at least one system state for the safety controller, wherein the operating state data record represents the process state and the system state.

In this case, a system state for the safety controller is intended to denote all the states which are representative of the safety controller and the peripherals connected thereto, such as sensors and actuators. By contrast, a process state for the installation to be controlled is a state which the installation to be controlled can adopt in a controlled process, said process being defined by the user program executed in the safety controller. By way of example, the failure of a sensor or a short circuit in a line to a sensor is a system state, whereas the state "tank empty" denotes a process state for a fuel depot.

The combination of diagnosis information to produce process and system states in a common central data record simplifies the access to diagnosis information even further, particularly when said data record is processed in the user program like a variable. The user program can access all the diagnosis-related information centrally.

In a further refinement, the operating state data record comprises a plurality of diagnosis reports that are different one from the other, wherein each of said diagnosis reports represents an ascertained operating state. Preferably, each of these diagnosis reports represents the ascertained operating state depending on a selected special operating mode and/or depending on an access authorization, and the diagnosis reports are displayed depending on the selected special mode and/or the access authorization.

Usually, a diagnosis report comprises four information components: a "what" component, which provides information regarding what has occurred, i.e. what kind of fault or what kind of error is present. A "where" component, which provides information about where the fault or the error has occurred. A "how" component, which provides information about how the fault or the error can be rectified. A "who" component, which provides information about who can rectify the fault or the error. It is particularly advantageous to adjust the diagnosis report to be displayed to match the access authorization of the person who is reading the display unit. In the case of a user, it is normally sufficient to notify him of what has occurred or is faulty and who can rectify the fault. In particular, information regarding who can rectify the fault, that is to say who is the appropriate contact person, results in a time saving and hence in a cost saving, since the relevant person can be contacted directly. In the case of a simple user, it is not necessary to display how the fault can be rectified, since this person is incapable of rectifying the fault due to lack of access authorization. In the case of a maintenance person, the diagnosis report can—provided that a fault is involved which he is able to rectify on the basis of his access authorization—comprise not only the information regarding what has occurred but also a piece of information about where the fault has occurred and how it can be rectified. If this is a fault which he cannot rectify on the basis of his access authorization, it is sufficient if the diagnosis report comprises a piece of information about what kind of fault is present and who can rectify it. In the case of a set-up person, in the case of a programmer of the user program and in the case of a manufacturer of the safety controller, a diagnosis report will usually comprise a piece of information about what has occurred, where it has occurred, how the fault can be rectified and who can do this. In this case, starting from the set-up person through to the programmer of the user program and to the manufacture of the safety controller, the information component regarding how a fault can be rectified will increase and at the same time the information component which can rectify a fault will decrease, since, from the set-up person through to the programmer of a user program and to the manufacturer of a safety controller, the opportunities for intervening action in the installation to be controlled or in the safety controller increase as result of the increasing access authorization. In comparison with the set-up and the writer of the user program, the manufacturer of the safety controller will have its focus on the safety controller in terms of the information component regarding what has occurred. In the case of a manufacturer of a safety controller concerning the displayed faults, logic hardware components which the safety controller comprises or the operating system implemented in the safety controller, for example. Diagnosis reports intended for a safety officer will mainly comprise information regarding what kind of faults have occurred, and additionally information regarding when these faults have occurred.

With respect to an ascertained process state for the installation to be controlled, it is also very effective to select the diagnosis report representing the ascertained process state on the basis of a detected access authorization. The diagnosis report representing an ascertained process state comprises a piece of information about what state defined by the user program is being taken by the installation to be controlled. In this case too, the content of the information displayed by means of the display unit can be adjusted to match the person reading the diagnosis report on the display unit. It is thus of great importance for a user, a maintenance person and a safety officer to be notified about individual process states which the installation to be controlled takes at a defined instant of time, whereas this is less important to a set-up person, a programmer of a user program and the manufacturer of a safety controller. By way of example, for these people, diagnosis reports which represent a process state can be reduced to the information content "Correct operation" or "Faulty operation". Sometimes, the display of such diagnosis reports can even be dispensed with. Overall, this increases readability or clarity on a display unit.

With respect to an ascertained process state for the installation to be controlled, it is also very advantageous to select the diagnosis report which represents this process state on the basis of a special operating mode. If the installation is being operated in automatic mode, all diagnosis reports which relate to ascertained process states should be displayed. In this case, however, it is recommended that the information content of the diagnosis report be adjusted to match the role of the reader to whom the diagnosis report is being displayed by means of a display unit. By way of example, it is thus sufficient to notify the user of an installation that a particular liquid container needs to be filled. By contrast, a maintenance person can additionally be notified of where this container is located in the installation and, by way of example, where the liquid that is to be refilled is stored. For a safety officer, the information to be conveyed can be conditioned in terms of the evaluations which he needs to make, for example. The above explanations show that it is of particular advantage to identify diagnosis reports both on the basis of the selected operating mode and on the basis of the detected access authorization. This is the case particularly because the access authorization which is associated with a person reading the display unit does not inevitably have to correlate to the selected special operating mode, as shown by the explanations above. If the installation is being operated in a set-up mode, it is possible, by way of example, to stop diagnosis reports which represent process states resulting from an open guard door, for example. This is because these diagnosis reports do not have any information content which goes beyond the knowledge of the set-up person who is working on the installation to be controlled within his set-up work. The set-up person knows that the guard door is open. By contrast, diagnosis reports specifically adapted to the set-up mode can be displayed which, by way of example, comprise an information content regarding whether a combination of movements which is planned by the set-up person is consistent with the circumstances of the machine. If an installation is being operated in a weekend mode, it is recommended to stop diagnosis reports which represent process states originating from installation parts which have been shut down as a result of the weekend mode, since these diagnosis reports can be disregarded in this special operating mode.

With respect to an ascertained system state for the safety controller, it is also particularly effective to identify diagnosis reports which represent a system state on the basis of the selected special operating mode. If an installation is being operated in automatic mode, all diagnosis reports which represent system states should be displayed. It is also usually necessary in this case to indicate not only the information regarding what has occurred where but also who can rectify the fault. If, by contrast, the installation is being operated in an operating mode in which repair work on the installation can be performed, it is not necessary that diagnosis reports representing a system state comprise details about who can rectify a fault, since usually people who do the repairs have the relevant ability. In such a case, it is instead advantageous to display information about what needs to be done to rectify the fault. Similarly, it may be advantageous to display datasheets or similar information about a component that needs to be repaired or replaced.

The above explanations show that diagnosis reports can be displayed very flexibly using the novel approach.

In a further refinement, the user program has at least one safety control module, in which safety-related control input signals are processed in failsafe fashion, and at least one standard control module, in which predominantly process-related control input signals are processed.

In this refinement, the plurality of sensors advantageously comprises a first number of sensors which are designed to detect safety-related variables, wherein said safety-related variables are supplied to the safety control module using safety-related control input signals, and a second number of sensors which are designed to detect process-related variables, wherein said process-related variables are supplied to the standard control module using process-related control input signals. Furthermore, this refinement advantageously provides for the plurality of control output signals to comprise a first number of control output signals, which are identified in the safety control module and which are intended for the actuation of a first number of actuators designed to perform safety-related actions, and to comprise a second number of control output signals, which are identified in the standard control module and which are intended for the activation of a second number of actuators designed to perform process-related actions. This design of the user program, according to which the user program comprises at least one safety control module and at least one standard control module, allows one and the same user program to be used to handle both control tasks which are associated with a safety control aspect and control tasks which are associated with a standard control aspect. It is therefore possible to use a safety controller designed to implement both control tasks which are associated with the safety control aspect and control tasks which are associated with the standard control aspect. This has the advantage that comprehensive control of an installation, i.e. control which covers both the safety control aspect and the standard control aspect, requires only one controller rather than two controllers, one of which handles the control tasks which are associated with the safety control aspect and one of which handles the control tasks which are associated with the standard control aspect. This also reduces the complexity required for the wiring. Overall, this measure is an inexpensive way of implementing comprehensive control for an installation. At this occasion, it should be pointed out that the wording that the standard control module is used to process predominantly process-related control input signals means that the standard control module can also be used to process safety-related control input signals.

In a further refinement, the system state represents a faulty actuator and/or sensor.

Particularly in the case of diagnosis reports which represent a faulty actuator and/or a faulty sensor, it is advantageous to adjust the information to be conveyed to match the role of the person who is reading the information. It is thus sufficient for a user of an installation, for example, to be informed that there is a faulty actuator or a faulty sensor. By contrast, it is useful to display additional information to a maintenance person. By way of example, this may be a piece of information about which actuator or which sensor is faulty. Using such a piece of component-specific information, the maintenance person is able to quickly replace the faulty component. A faulty actuator or a faulty sensor is meant to be an actuator or sensor which is does not properly operate or which cannot be explicitly evaluated for another reason. At this occasion, it should be explained what is meant to be understood by a sensor: a sensor may exclusively be a detection unit which can be used to detect a physical variable. Alternatively, a sensor may be designed as a combination comprising such a detection unit and a signal processing unit, wherein the signal processing unit is designed to perform various signal conditioning measures, for example analog/digital conversion or signal amplification.

In a further refinement of the aforementioned measure, the diagnosis evaluation unit is designed to select the diagnosis report on the basis of a location statement, wherein the location statement represents the installation location of the actuator and/or of the sensor within the installation.

Particularly in the case of a location statement, it is advantageous to include or ignore said location statement in a diagnosis report depending on the role of the person reading the display unit. For instance, it is irrelevant to a user of an installation where a faulty sensor or a faulty actuator is located, since he cannot make a replacement on account of a lack of access authorization. Consequently, a location statement can be dispensed with in a diagnosis report in the case of a user. The omission of the location statement results in increased clarity for the information displayed by means of a display unit. By contrast, a location statement is a useful piece of information for a maintenance person, since it allows him to quickly replace a faulty sensor or a faulty actuator. Consequently, a location statement should be contained in a diagnosis report for a maintenance person.

In a further refinement, the user program is established by providing a plurality of software components, wherein a plurality of the software components correspond to a plurality of installation hardware components of the automated installation to be controlled.

On account of this measure, it is possible to write a user program in a particularly simple and clear manner. This makes for a relatively high level of fail safety for the programming of a safety controller.

When adjusting the diagnosis report to match the person who is reading a display unit, it needs to be defined which ones of those many information items are to be contained in the diagnosis report and how detailed the explanation of the individual information items should be. Both can be defined by evaluating the access authorization associated with the person. For a user, it is sufficient if this information component comprises a piece of information about what kind of fault is present and who can rectify it. That is to say that a diagnosis report intended for a user comprises a "what" component and a "who" component. For a maintenance person, a programmer of a user program and the manufacturer of the safety controller, not only the information regarding "what" and "where" but also the information regarding how the fault or the error can be rectified are desired. Consequently, a diagnosis report intended for this person comprises not only a "what" component and a "where" component but also a "how" component. In this case, the level of detail in the "how" component is adjusted to match the options defined by the access authorization for taking intervening action on the installation and/or on the safety controller. This adjustment also applies to the "what" component and the "where" component. First, by way of example, the manufacturer of the safety controller can be provided with a specific display indicating which logic component contained in the control device as such is faulty or which module of the operating system stored in the safety controller comprises an error, whereas it is sufficient to display to the writer of a user program merely the fact that there is an error in the safety controller. Consideration of the detected access authorization allows particularly effective adjustment of a diagnosis report to match the person reading a display unit in respect of an ascertained system state, whereas, in respect of an ascertained process state, consideration of a selected special operating mode allows particularly effective adjustment of a diagnosis report to match the person reading a display unit.

It goes without saying that the features mentioned above and the features which are yet to be explained below can be used not only in the respectively indicated combination but also in other combinations or on their own without departing from the scope of the present invention.

BRIEF DESCRIPTION OF THE DRAWINGS

Exemplary embodiments are illustrated in the drawing and are explained in more detail in the description below, in which.

DESCRIPTION OF PREFERRED EMBODIMENTS

Figure 1:
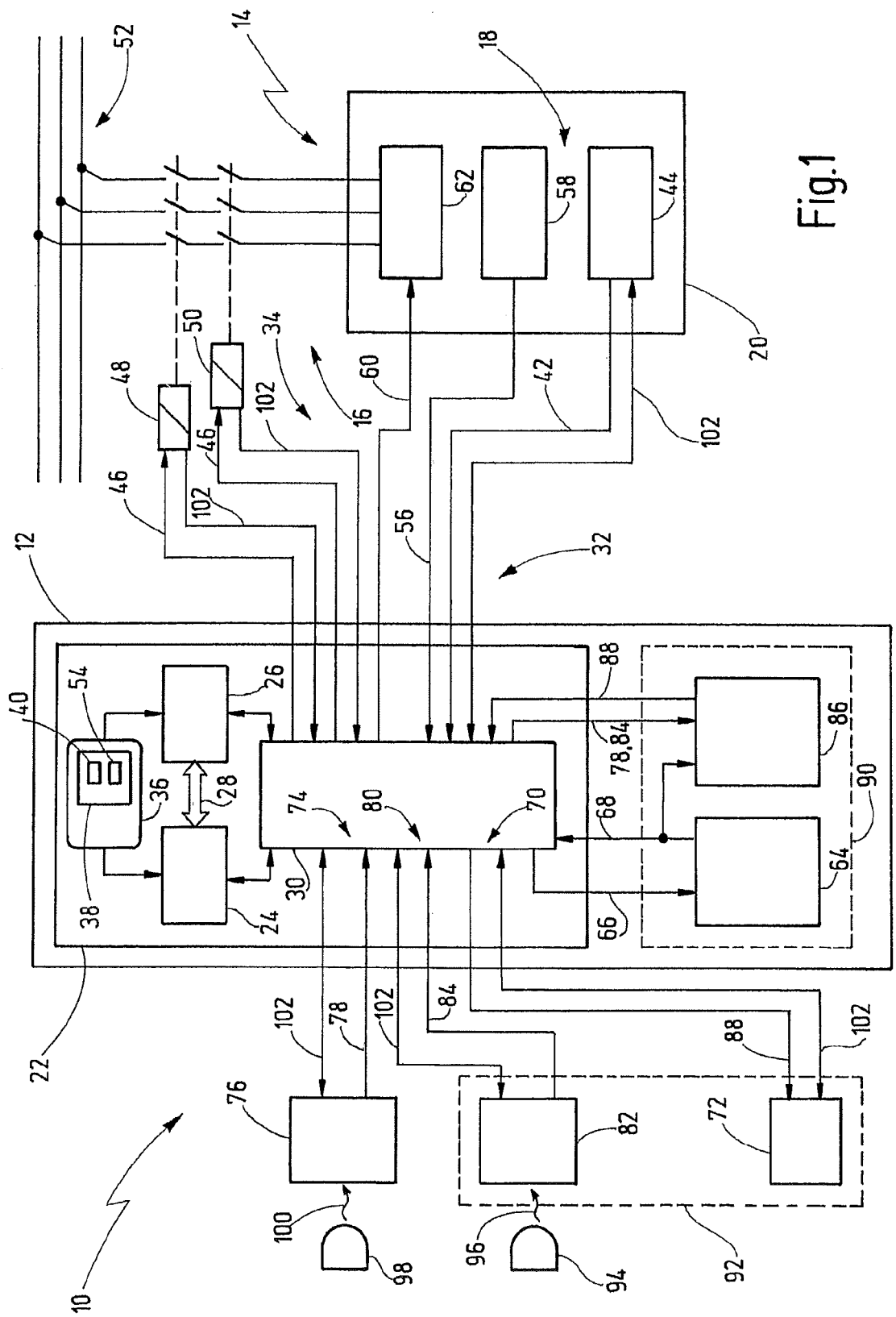
FIG. 1 shows a schematic illustration of a novel safety controller in combination with an installation to be controlled.

FIG. 1 shows a safety circuit, denoted as a whole by reference numeral 10, which comprises a safety controller 12 designed to control an installation 14. The installation 14 comprises a plurality of actuators 16 and a plurality of sensors 18. As an example, a load 20 is shown, which load is a part of the installation 14 and may be a robot, for instance.

The safety controller 12 comprises a control unit 22. The control unit 22 is of two-channel redundant design in order to achieve the required fail safety for controlling safety-critical processes. As a representation of the two-channel design, FIG. 1 shows two separate processors 24, 26 which are connected to one another by means of a bidirectional communication interface 28 in order to be able to monitor one another and to interchange data. Preferably, the two channels of the control unit 22 and the two processors 24, 26 are diverse, i.e. of different design to one another, in order to avoid systematic faults.

Reference number 30 denotes an input/output unit which is connected to each of the two processors 24, 26. The input/output unit 30 receives a plurality 32 of control input signals from the plurality 18 of sensors and forwards said signals in an adjusted data format to each of the two processors 24, 26. In addition, the input/output unit produces a plurality 34 of control output signals used to actuate the plurality 16 of actuators in response to the two processors 24, 26.

Reference numeral 36 denotes a chip card which is used to store a user program 38. The user program 38 is written using a programming tool. By way of example, the programming tool is a computer program which can be executed on a conventional PC. In this case, the use of a chip card 36 as a storage medium allows simple interchange of the user program 38 even without direct connection to the PC on which the programming tool is executed. Alternatively, the user program 38 also be stored in a memory, for example an EEPROM, which is permanently installed in the control unit 22.

The user program 38 defines the control tasks to be performed by the safety controller 12. To this end, the user program 38 comprises a safety control module 40 where those control tasks which are associated with the safety control aspect are performed. In the safety control module 40, safety-related control input signals 42 produced by safety sensors 44 associated with the safety control aspect are processed in failsafe fashion. By way of example, the safety sensors 44 are emergency-off pushbuttons, two-hand controllers, guard doors, rotation speed monitoring appliances or other sensors for picking up safety-related parameters. In accordance with the associated control tasks in the safety control aspect, the safety-related control input signals 42 are taken as a basis for producing safety-related control output signals 46 which are used to actuate safety actuators 48, 50, i.e. actuators associated with the safety control aspect. By way of example, the safety actuators 48, 50 are what are known as contactors, the operating contacts on which are arranged in the connection between a power supply 52 and the load 20. The safety actuators 48, 50 can be used to disconnect the power supply from the load 20, which means that it is possible to transfer the load 20 to a safe state when a relevant malfunction occurs.

Furthermore, the user program 38 has a standard control module 54 which is used to perform those control tasks which are associated with the standard control aspect. To this end, the standard control module 54 is used to process process-related control input signals 56 which are produced by standard sensors 58. The standard sensors 58 are sensors detecting input variables which are required for closed-loop drive control, for example. By way of example, these may be rotational signals, such as rotational angles or rotational speeds. On the basis of the process-related control input signals 56, process-related control output signals 60 are produced in accordance with the control tasks associated with the standard control aspect and are supplied to standard actuators 62. By way of example, the standard actuators 62 may be motors or control cylinders.

The design chosen for the user program 38 in this exemplary embodiment, namely said user program comprising a safety control module 40 and a standard control module 54 which allows the control unit 22 to perform both control tasks associated with the safety control aspect and control tasks associated with the standard control aspect, is not intended to have any limiting effect. It is also conceivable for the control unit 22 to perform only control tasks which are associated with the safety control aspect. In this case, the user program 38 does not comprise a standard control module 54.

The input/output unit 30 is also used for linking further components of the safety controller 12 to the two processors 24, 26. Thus, a number 66 of diagnosis input signals are supplied to a diagnosis evaluation unit 64, namely via the input/output unit 30 in this case. The diagnosis evaluation unit 64 is designed to take the number 66 of diagnosis input signals as a basis for ascertaining which of a plurality of operating states is present at a selected instant of time. The plurality of operating states comprise at least one process state for the installation 14 to be controlled and at least one system state for the safety controller 12. The system state represents not only the system state of components of the safety controller 12, but also of all units which are electrically connected to the safety controller 12. These are the safety sensors 44, the safety actuators 48, 50, the standard sensors 58, the standard actuators 62 and also a display unit yet to be described and signaling devices yet to be described. Similarly, the system state is intended to cover all wiring which is present between the safety controller 12 and the units listed above.

The diagnosis evaluation unit 64 produces an operating state data record 68 which represents an ascertained operating state. The operating state data record 68 comprises a plurality of diagnosis data and a Boolean status indicator which, as a Boolean variable, can assume a first state, such as "true", and a second state, such as "false". The status indicator thus signals whether or not a particular operating state is actually present. It is to be point out that the operating state data record 68 with the Boolean status indicator is supplied here to the input/output unit 30. The user program executed in the control unit is thus able to access the operating state data record 68 with the Boolean status indicator and to initiate measures based on the ascertained operating state.

The safety controller 12 also comprises an interface 70 for a display unit 72. The display unit 72 is designed to display diagnosis reports.

In addition, the safety controller 12 comprises an interface 74 for a mode selection unit 76. The mode selection unit 76 is designed to select one of a plurality of special operating modes that are different one from the other, wherein the special operating modes are each different from the operating automatic mode. The mode selection unit 76 provides a special operating mode signal 78 which represents the selected special operating mode. The special operating mode signal 78 is supplied to the control unit 22 in order to operate the installation 14 in the selected special operating mode.

In addition, the safety controller 12 has an interface 80 for a detection unit 82. The detection unit is designed to detect an access authorization which is associated with a person interacting with the safety controller 12, particularly with a person reading the display unit 72. The detection unit 82 provides an access authorization signal 84 which represents the detected access authorization.

Furthermore, the safety controller 12 has a diagnosis selection unit 86. The diagnosis selection unit 86 is supplied with the operating state data record 68. In addition, the diagnosis selection unit 86 is supplied with the special operating mode signal 78 and/or with the access authorization signal 84 via the input/output unit 30. On the basis of the ascertained operating state and on the basis of the selected special operating mode and/or the detected access authorization, the diagnosis selection unit 86 selects an appropriate diagnosis report. The diagnosis selection unit 86 produces a diagnosis signal 88 which represents the diagnosis report and which is supplied to the display unit 72 via the input/output unit 30 for the purpose of displaying the diagnosis report. The diagnosis evaluation unit 64 and the diagnosis selection unit 86 may be combined to form a diagnosis unit 90, as indicated by the dashed lines.

The display unit 72 and the detection unit 82 may be combined to form a physical unit 92, as indicated by the dashed lines. Advantageously, the detection unit 82 can be integrated into the display unit 72.

The detection unit 82 is designed to detect the access authorization by interacting with a mobile access authorization unit 94, as indicated by an arrow 96. Various embodiments are conceivable for the detection unit 82 and hence also for the mobile access authorization unit 94. In a first embodiment, the mobile access authorization unit 94 is in the form of a mechanical key which can be put into a key holder arranged on the detection unit 82. This first embodiment corresponds to an operating mode selection switch in mechanical form. In a second embodiment, the mobile access authorization unit 94 may be in the form of a transponder, the data from which can be read by the detection unit 82, which is in the form of a reader. The transponder comprises access authorization data which represent the access authorization. A third embodiment is conceivable which is a combination of the first embodiment and the second embodiment. That is to say that the mechanical key comprises a transponder and the detection unit 82 comprises a reader for the transponder in the region of the key holder. In addition, a fourth embodiment is conceivable in which the detection unit 82 has a number of input elements which can be used to input the access authorization. In this case, the detection unit 82 is in the form of an alphanumeric input unit, for example. In this embodiment, a mobile access authorization unit 94 is not required. The order in which the individual embodiment are listed is not intended to be an assessment regarding opportunities for using them.

The mode selection unit 76 is designed to select the special operating mode by interacting with a mobile special operating mode unit 98, as illustrated by an arrow 100. The mobile special operating mode unit 98 may be in the form of a transponder which comprises special operating mode data representing a defined special operating mode. In this case, the operating mode selection unit 76 is in the form of a reader which can be used to read the special operating mode data from the transponder.

The operating mode selection unit 76 and the detection unit 82 may be referred to as signaling devices.

The input/output unit 30 is used to interchange test signals 102 between the safety controller 12 and the safety sensors 44, the safety actuators 48, 50, the display unit 72, the operating mode selection unit 76 and the detection unit 82. The test signals 102 can be used in the safety controller 12 to ascertain whether the units and components connected to the latter are operating correctly, which is necessary, since it must be ensured that the installation 14 to be controlled is in a safe state as soon as a malfunction occurs on a device connected to the safety controller 12.

Figure 2:
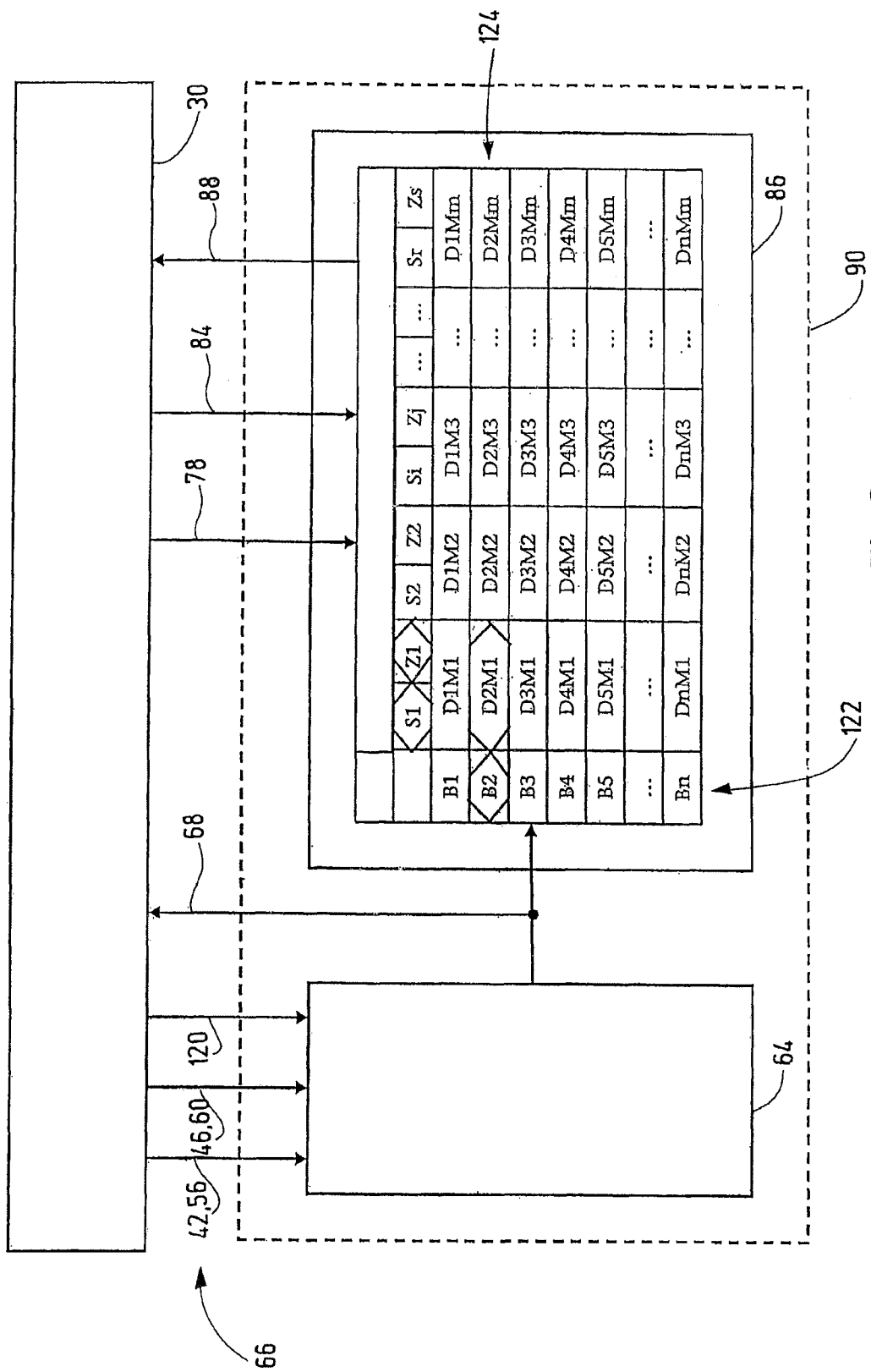
FIG. 2 shows a schematic illustration of a diagnosis selection unit comprised in the safety controller.

The illustration in FIG. 2 is used to explain the mode of operation of the diagnosis evaluation unit 64 and particularly the mode of operation of the diagnosis selection unit 86.

From the input/output unit 30, a number 66 of diagnosis input signals are supplied to the diagnosis evaluation unit 64. These may be the following signals: the safety-related control input signals 42 and the process-related control input signals 56; the safety-related control output signals 46 and the process-related control output signals 60 and also further signals 120. The further signals 120 may comprise the test signals 102, the access authorization signal 84, the special operating mode signal 78 and also signals identified and processed in the control unit 22.

On the basis of the signals supplied in total, the diagnosis evaluation unit 64 ascertains which of a plurality of operating states 122 is present at a defined instant of time. This is done by virtue of appropriate evaluation of the supplied signals. The ascertained operating state may be a process state for the installation 14 to be controlled or may be a system state for the safety controller 22. By way of example, a system state may be a short circuit to ground or to the supply voltage, may be a sensor fault, may be an actuator fault, may be a conductor fracture, may be an error occurring in the chip card 36, may be an error occurring in one of the processors 24, 26 or may be a similar error. Usually, a process state for the installation to be controlled is ascertained by comparing particularly the process-related control input signals 56 with prescribed threshold values.

The diagnosis evaluation unit 64 produces an operating state data record 68 which represents the ascertained operating state. The operating state signal 68 is supplied both to the input/output unit 30 and to the diagnosis selection unit 86. As shown in the illustration in FIG. 2, the ascertained operating state is intended to be the operating state B2, as indicated by the chamfered corners. The diagnosis selection unit 86 stores a plurality of diagnosis reports that are different one from the other for each of the plurality of operating states 122. For the ascertained operating state B2, a plurality 124 of diagnosis reports that are different one from the other are stored. From the input/output unit 30, the special operating mode signal 78, which represents the selected special operating mode, and the access authorization signal 84, which represents the detected access authorization, are supplied to the diagnosis selection unit 86. In the present case, the selected special operating mode is assumed to be the special mode S1 and the detected access authorization is assumed to be the access authorization Z1, as respectively indicated by the chamfered corners. Accordingly, the diagnosis selection unit 86 selects the diagnosis report D2M1 from the plurality 124 of diagnosis reports that are different one from the other and produces the diagnosis signal 88, which represents this diagnosis report and is supplied to the input/output unit 30 for the purpose of forwarding to the display unit 72.

The diagnosis selection unit 86 stores a plurality of diagnosis reports that are different from one another for each of the plurality of operating states 122. Each of the plurality of diagnosis reports that are different from one another comprises a respective associated diagnosis report for each of the special operating mode states S1 to Sr that are different from one another and/or for each of the access authorizations Z1 to Zs that are different from one another. Overall, the diagnosis selection unit 86 stores the diagnosis reports D1M1 to DnMn for the plurality of operating states 121 B1 to Bn.

The refinement on which the exemplary embodiment is based for the safety controller, according to which the safety controller is used to handle both control tasks associated with the safety control aspect and control tasks which are associated with the standard control aspect using one and the same control unit, is not mandatory for implementing the concept of the invention. For both categories of control tasks, it is also possible to use separate control units.

The display unit 72 may be arranged in a control console of the installation 14. Alternatively, it may be a separate display unit. It may be in the form of an LCD screen or in the form of an alphanumeric text display.

The process diagnosis report may be "Container empty", for example. Examples of suitable system diagnosis reports are "Memory faulty", "Short circuit to 24 V" or "Hardware error".

What is claimed is:

1. A safety controller for controlling an automated installation which has a plurality of sensors and a plurality of actuators, said safety controller comprising:
   a control unit to which a plurality of control input signals from the sensors are supplied, said control unit being designed to produce a plurality of control output signals on the basis of the control input signals and in accordance with a user program running in an automatic mode in said control unit, wherein the plurality of control output signals are configured to actuate the plurality of actuators,
   a diagnosis evaluation unit to which a number of diagnosis input signals are supplied, wherein the diagnosis evaluation unit is designed to take the diagnosis input signals as a basis for ascertaining which particular operating state from plurality of predefined possible operating states is present at a defined instant of time, and
   an interface for a display unit designed to display diagnosis reports from the diagnosis evaluation unit,
   wherein the diagnosis evaluation unit produces an operating state data record representing said particular operating state from the plurality of predefined possible operating states, wherein said operating state data record comprises a diagnosis report for display on the display unit and comprises a Boolean status indicator which signals whether or not said particular operating state is actually present, wherein the Boolean status indicator can be retrieved and read as a Boolean variable in the user program, and wherein the control unit is designed to actuate at least one of the plurality of actuators as a function of said Boolean status indicator.

2. The safety controller of claim 1, wherein the plurality of operating states comprise at least one process state that the installation adopts in response to the control output signals, and at least one system state of the safety controller, wherein the operating state data record represents both the process state and the system state.

3. The safety controller of claim 1, wherein the operating state data record comprises a plurality of diagnosis reports that are different from one another, with each of said different diagnosis reports representing said particular operating state, wherein the control unit is configured to receive a user access authorization signal representing a user access authorization, and wherein the diagnosis evaluation unit selects one of the plurality of diagnosis reports as function of the user access authorization.

4. The safety controller of claim 1, wherein the operating state data record comprises a plurality of diagnosis reports that are different from one another, with each of said different diagnosis reports representing said particular operating state, wherein the control unit is configured to run in one of several different operating modes, and wherein the diagnosis evaluation unit selects one of the plurality of diagnosis reports as function of said one of said several operating modes.

5. The safety controller of claim 1, wherein the operating state data record comprises a plurality of diagnosis reports that are different from one another, with each of said different diagnosis reports representing said particular operating state, wherein the diagnosis evaluation unit is designed to select a diagnosis report on the basis of a location statement representing a location of a faulty actuator or a faulty sensor within the installation.

6. The safety controller of claim 1, wherein the user program has at least one safety control module, in which safety-related control input signals are processed in failsafe fashion, and at least one standard control module, in which process-related control input signals are processed in a non-failsafe fashion.

7. A method for controlling an automated installation which comprises a plurality of sensors and a plurality of actuators, the method comprising the steps of:

supplying a plurality of control input signals from the sensors to a control unit, wherein the control unit produces a plurality of control output signals on the basis of the control input signals and in accordance with a user program running in an automatic mode in said control unit, actuating the plurality of actuators using the plurality of control output signals, ascertaining which particular operating state from a plurality of predefined possible operating states is present at a defined instant of time and producing an operating state data record which represents said particular operating state, said operating state data record comprising a diagnosis report including a Boolean status indicator which signals whether or not said particular operating state is actually present, displaying the diagnosis report on a display unit, retrieving and reading said Boolean status indicator as a Boolean variable in the user program, and actuating at least one of the actuators as a function of the Boolean status indicator.

8. A computer program product comprising a data storage medium having program code stored which is designed to be loaded into the memory of a safety controller for controlling an automated installation having a plurality of sensors and a plurality of actuators, with said program code being designed to carry out a method comprising the following steps when executed on the safety controller:

receiving a plurality of control input signals from the sensors and producing a plurality of control output signals on the basis of the control input signals, providing the plurality of control output signals for actuating the plurality of actuators, ascertaining which particular operating state from a plurality of predefined possible operating states is present at a defined instant of time and producing an operating state data record which represents said particular operating state, said operating state data record comprising a diagnosis report including a Boolean status indicator which signals whether or not said particular operating state is actually present, displaying the diagnosis report on a display unit, retrieving and reading said Boolean status indicator as a Boolean variable in the user program, and actuating at least one of the actuators as a function of the Boolean status indicator.

* * * * *